C. PATTON.
Grain Drill.
No. 59,638.
Patented Nov. 13, 1866.
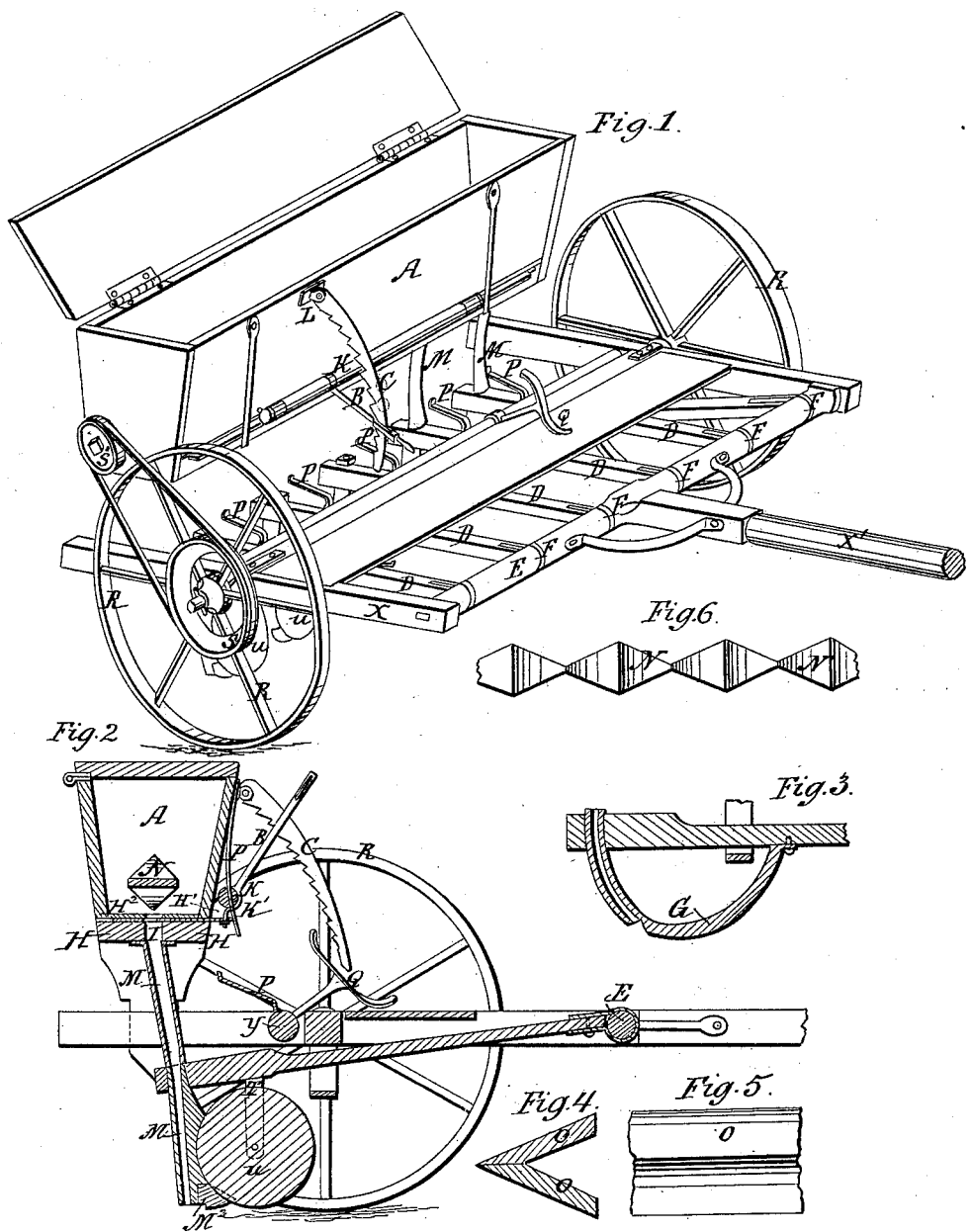

UNITED STATES PATENT OFFICE.

CHARLES W. PATTON, OF EXETER, ILLINOIS.

IMPROVEMENT IN WHEAT-DRILLS.

Specification forming part of Letters Patent No. 59,638, dated November 13, 1866.

*To all whom it may concern:*

Be it known that I, CHARLES W. PATTON, of Exeter, in the county of Scott and State of Illinois, have invented a new and useful Improvement in Grain-Drills; and I do hereby declare that the following is a full, clear, and exact description of the same, reference being had to the annexed drawings, making part of this specification, in which—

Figure 1 is a perspective view. Fig. 2 is a vertical longitudinal section. Fig. 3 is a similar section of a tooth and cutter. Fig. 4 is a section of the broadcast attachment, and Fig. 5 is a side elevation of the same.

I employ the same letters in the different figures in referring to identical parts.

X is the main frame, and X' the tongue. The hopper A is placed upon the frame behind the axles of the wheels R, and so disposed that the weight of the driver riding upon hopper A as a seat shall balance the weight of the tongue, and thus relieve the necks of the horses.

The teeth $M^1$ have a tubular opening through them for discharging the grain in rear of the shoe $M^2$. The teeth are attached each to the drag-bars D, which are hinged to the front bar, E, of the main frame by straps F, which permit the free vertical movement of the drag-bars by the standards T. Attached to the drag-bars in front of the teeth are sustained the circular cutters U, which run along the ground, turning on their axes, immediately in front of the teeth $M^1$ and shoes $M^2$. Another form of teeth is shown in Fig. 3, (marked G,) in which a quadrant-formed extension is carried from the point of the tooth to the under side of the drag-bar. This knife-edged cutter is used for the same purpose as the circular ones— viz., to cut the way for the tooth free from grass, &c.

The shaft Y passes across the grain, sustaining the springs P, which, with the turning of the shaft Y, may be raised or pressed upon the upper faces of the drag-bar by the foot resting on the foot-piece Q.

The seed passes from the hopper A to the tube in the teeth $M^1$ through the tubes M. The bottom of the hopper H has openings I from the hopper to the tubes M. On this bottom slides a sliding piece, H, with holes corresponding to those through the bottom. This slide H is inserted through a slot in the front of the hopper, through which it extends.

On the front of the hopper, above the slide, is placed a shaft, K, mounted on journals at the ends, so as to turn freely. The shaft K is connected at each end with the slide $H^1$ by ties K', and is revolved by the hand-lever B, which has a slot, through which passes the notched catch C, hinged to the hopper. The slide may be so adjusted as to leave any required amount of opening from the hopper to the tubes by means of this lever, which is held in position by the catch C.

A metallic plate in the bottom of the hopper (shown at $H^2$) covers the slide. It has openings corresponding with those through the bottom H and slide $H^1$. The slide $H^1$ may be so adjusted as to leave open a full aperture, or only a very small one, as may be desired. Springs P', resting against the edge of the slide, press it back when the lever B is released, so as to entirely close the aperture leading from the hopper to the tubes.

The grain in the hopper is kept in motion by the agitator N, extending across the length of the hopper and rotated by a pulley, S', deriving motion by a belt from a pulley, S, on the wheel surrounding the hub. This agitator is formed from a square piece by cutting it into the form shown, so as to form in alternate faces of each section four triangles, with the apex of one at the base of the two adjoining ones.

When it is desired to sow the grain broadcast, the tubes M are removed and the piece O placed below the openings I. The grain falling upon the inclined face is, with the motion of the machine, evenly scattered over the ground. This scattering-board O is hung on pivots under the seed-box, having its apex immediately under the opening I, so as to divide and scatter the seed on each side. Pins may be placed on the faces of the board O, to scatter the grain more perfectly as it falls.

More than one hopper may be employed, so that small seed may be sown at the same time that the wheat is being sown. In this case the second box would be placed in front of the hopper A, and motion be communicated to the agitator from a pulley on the shaft adjoining the pulley S'.

What I claim as my invention, and desire to secure by Letters Patent, is—

1. The shaft Y, operated by the foot-lever Q, to press the springs P upon the drag-bars D, substantially in the manner set forth.

2. In combination with the shaft Y, lever Q, and springs P, the hinged drag-bars D, teeth M, and cutters U or G, substantially as set forth.

3. The agitator N, when constructed as described.

4. The slide $H^1$, operated by springs P' and a lever, B, in combination with the bottom H, when constructed substantially as and for the purpose set forth.

CHARLES W. PATTON.

Witnesses:
 H. W. HITT,
 SAMUEL BORUM.